Dec. 12, 1933. F. LJUNGSTRÖM 1,938,632
BRAKE
Filed April 3, 1930
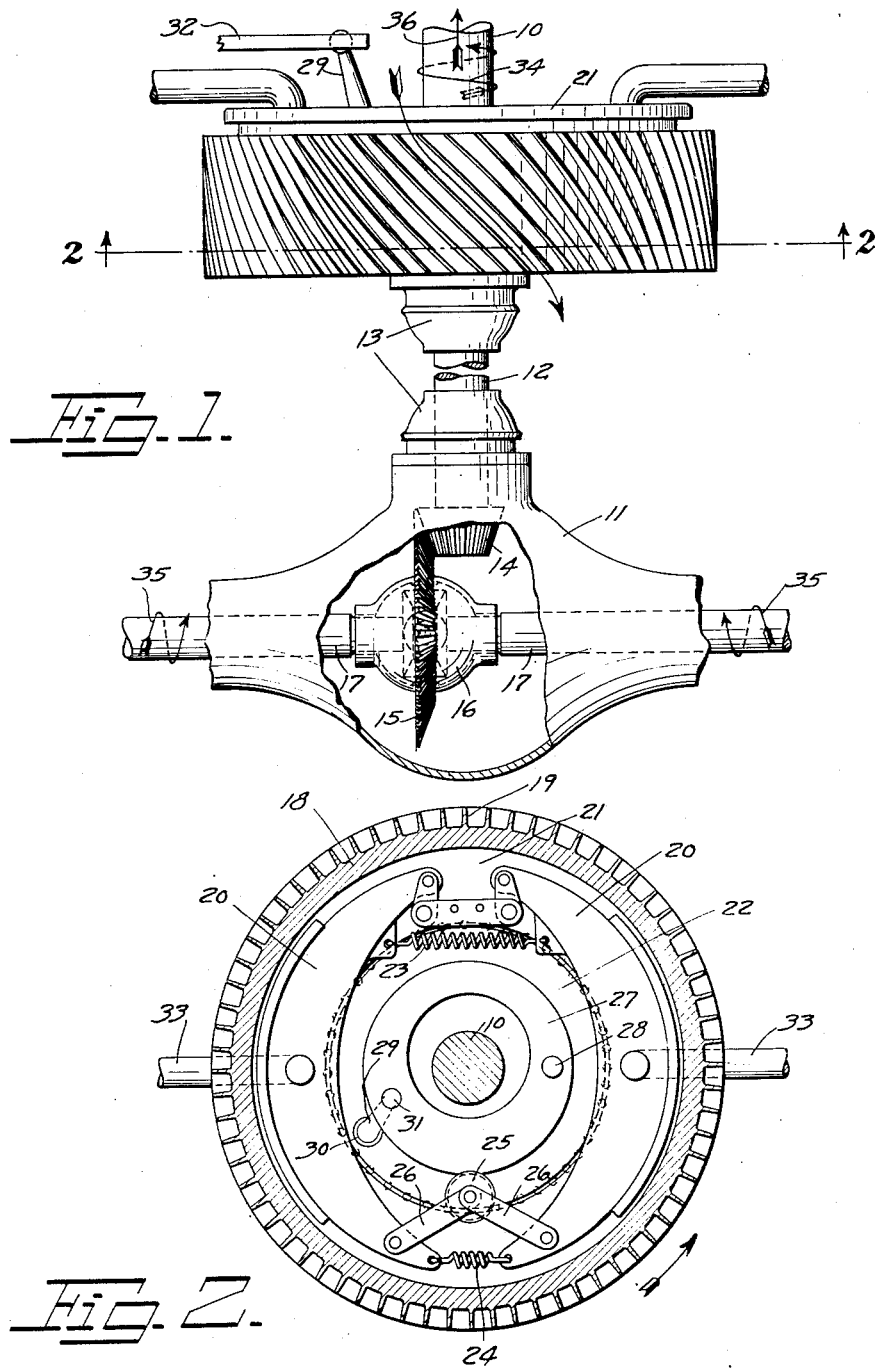
INVENTOR
Fredrik Ljungström
BY
Wm. J. Hedlund
his ATTORNEY Patented Dec. 12, 1933

1,938,632

UNITED STATES PATENT OFFICE

1,938,632

BRAKE

Fredrik Ljungström, Lidingo, Sweden, assignor, by mesne assignments, to Ped, Incorporated, a corporation of Delaware Application April 3, 1930, Serial No. 441,195, and in Sweden April 20, 1929

3 Claims. (Cl. 188—264)

My invention relates to brakes and has particular reference to brakes adapted to be used on self-propelled vehicles such as automobiles and the like. More specifically the invention concerns the cooling of such brakes.

One of the principal problems to be met in designing efficient automobile brakes is that of providing adequate brake cooling, since in many instances such brakes are called upon to act continuously and under heavy braking loads for relatively long periods of time, as, for example, in negotiating long mountain grades.

Automobile brakes heretofore developed as a general rule are not capable of braking continuously without overheating, this fact being recognized in the instructions given to automobile operators to utilize the braking power of their motors for negotiating long down grades in order to prevent burning out of their brakes. Skillful drivers avail themselves of the braking powers of their motors, but in many instances automobile drivers do not do so, often with serious results due to the inability of the present types of brakes to operate continuously under a heavy braking load.

Furthermore, there have been developed types of automatic transmissions for automobiles and the like which automatically over-run or free wheel, so that the motor cannot be used as a braking medium.

The principal object of the present invention is to provide an improved form of brake of the type referred to which is capable of continuous braking action under a maximum braking load without overheating of the brake. The manner in which the above object is carried into effect, together with the more detailed objects of the invention and the nature thereof may best be understood from a consideration of the ensuing description of a preferred form of apparatus for carrying the invention into effect.

In the accompanying sheet of drawing forming a part of this specification and illustrating a preferred form of the invention, Fig. 1 is a fragmentary plan view of the braking apparatus, and Fig. 2 is a transverse section taken on the line 2—2 of Fig. 1.

In Fig. 1 numeral 10 designates the driven shaft of an automobile transmission or its equivalent, from which power for propelling the vehicle is derived. Shaft 10 is connected to the driving axle of the vehicle, designated generally at 11, by means of a propeller shaft 12 connected to the axle through the medium of universal joints 13. One or more of the joints 13 may be omitted depending upon the particular construction of the vehicle. Shaft 12 is connected to a bevel pinion 14, which in turn engages a bevel ring gear 15. Gear 15 is connected through the differential mechanism indicated generally at 16 to the shafts 17, the latter being secured in driving relation to the driving wheels (not shown). For example, shafts 17 may be the live axle shafts of the axle of an automobile, or they may form part of the intermediate jack-shaft assembly of a heavy vehicle such as a truck, being connected to the driving wheels through the medium of a chain and sprocket drive. Pinion 14, gear 15, differential 16 and shafts 17 are all of well known form and are therefore not shown nor described in detail herein.

Secured to shaft 10 so as to rotate therewith is a brake drum 18, the outer cylindrical surface of which is provided with a plurality of cooling fins or ribs 19, said ribs, as shown in Fig. 1, being placed at an angle to the axis of rotation of the drum. These ribs are preferably, though not necessarily, formed as an integral part of the brake drum.

Within the brake drum there is disposed suitable internal expanding brake mechanism, the specific form of which is not a part of the present invention. For purposes of illustration I have shown a form of brake mechanism similar to the mechanism disclosed in my U. S. Pat. No. 1,923,102, granted August 22, 1933. This mechanism comprises a pair of brake shoes 20 pivoted at their upper ends to an annular plate 21, the latter being rotatably supported upon the fixed plate 22, which may be secured against rotation, for example, by attachment to the transmission housing (not shown). Brake shoes 20 are retracted from engagement with the inner surface of drum 18 by springs 23 and 24 and the brake shoes are brought into engagement with the drum against the action of these springs by the depression of a roller 25, pivotally secured to the lower ends of brake shoes 20 by means of the links 26. Depression of roller 25 is effected by movement of the annular actuating member 27, which is pivotally mounted at 28 to the fixed plate 22, and which is moved by the operating lever 29. One end of lever 29, which is supported in a ball and socket connection 30 in plate 22, engages member 27 at 31 while the other end of this lever is pivotally connected to the operating lever 32.

Brake shoes 20 each have secured thereto a rod 33, these rods acting both to prevent rotation of the brake shoe assembly with the drum when the brake is applied, and also if desired to utilize the drag of shoes 20 to apply additional brakes on the vehicle.

The operation of the brake mechanism just described is obvious, the brake shoes being retracted by springs 23 and 24 and being applied by movement of the operating lever 32 to depress the end of lever 25, thereby moving roller 25 to bring the brake shoes 20 into engagement with the brake drum.

As will be seen from Fig. 1, the pinion 14 and gear 15 are arranged so that rotation of shaft 10 (and also of drum 18) in the direction shown by arrow 34, causes rotation of the shafts 17 in the direction of arrows 35 to propel the vehicle. This in turn causes axial movement of the shaft 10 and the drum 18 in the direction of arrow 36. Obviously, reversal of the direction of rotation of shaft 10 will cause reversal of the direction of axial movement of drum 18. From this it will be seen that the angle of ribs 19 with respect to the axis of rotation of the drum is such that the ends of the ribs which are in advance with respect to the direction of rotation of the drum are also always in advance with respect to the direction of axial movement of the drum. This has an important bearing on the cooling effect of the ribs, as will presently appear.

In operation the arrangement just described provides an extremely efficient means for dissipating the heat generated by application of the brakes. In the first place, since the drum 18 is mounted to rotate with the propeller shaft its peripheral speed is materially greater than the peripheral speed of a similar drum mounted directly upon the wheel. This is due to the fact that in ordinary automobile practice the driving axle gear ratio is such that the propeller shaft usually rotates at from 3½ to 6 or more times as fast as the axle shafts, depending upon the character of the vehicle and the power plant propelling it. The brake drum, when mounted in the manner shown, is furthermore located so that it rotates about an axis generally parallel to the direction of movement of the vehicle, so that upon rotation of the drum there is an air flow axially across the face of the drum caused by movement of the vehicle.

The above factors can however be efficiently utilized in dissipating the heat generated by the brake only if the drum construction is such that flow of air across the cooling surfaces of the drum is facilitated. The use of circumferential ribs and also of internal oblique ribs to increase the cooling surface of the drum are known, but both of these expedients interfere with the proper flow of air. On the other hand, the use of cooling ribs in accordance with my invention not only increases the cooling surface but also facilitates the air flow thereover, so that all of the surface is utilized in a most efficient manner.

This may be illustrated by the following example: let it be assumed that the size of the vehicle wheels, the ratio of the driving gears and the diameter of drum 18 are such that the peripheral speed of the drum is the same as the speed of the movement of the vehicle. Let it further be assumed that the ribs 19 are disposed at an angle of 45 degrees to the axis of rotation of the drum. Under these conditions it will be evident that the air entering the passages between ribs 19 will not be deflected but will move axially past the drum. Further, it will be seen that the air in moving axially a distance equal to the width of the drum, which may be assumed as unity, will pass from end to end of the channels formed between ribs 19. The length of these channels is, however, equal to the $\sqrt{2}$ times the width of the drum, so that while the velocity of the air in axial direction is not increased under the conditions assumed, its speed of flow with respect to the walls of the channels through which it passes is materially increased. This increase in the speed of the air past the heat-radiating surface materially enhances the rapidity of heat transfer, and increases to a marked degree the cooling efficiency of the device.

The above example is theoretical, however, since it is based on movement of the drum through a body of still air. In practice, such air conditions will rarely if ever exist, and a most important advantage of my invention lies in the fact that efficient air flow is obtained under variable actual operating conditions.

The manner in which air flow is induced may best be understood by considering the action which takes place with the drum rotating but not moving axially. Under this condition air is thrown outwardly from the drum in radial direction, due to centrifugal force, and this action causes a partial vacuum to be formed in the channels between the ribs, which in turn induces air to flow into the forward ends of the channels to replace the air which has been thrown out by centrifugal force. Due to the oblique positioning of the ribs, the entering air is forced axially through the channels by what may be termed a screw action, which results in a constant and regular air flow over the entire cooling surface, such flow being axial until centrifugal force set up by deflection of the air causes the air to be thrown radially from the drum surface.

The examples given above illustrate two extreme cases, in one of which there is no lateral displacement or deflection of the air and in the other of which the maximum lateral deflection of the air takes place. In both cases it is seen that a regular air flow through the channels is produced, giving a maximum cooling effect.

Obviously, relative axial and rotational drum speeds other than those taken by way of illustration, as well as different angles of obliquity of the ribs, will result in different rates of radial flow of air from the drum surface and consequently in different rates of air flow through the channels, but in all cases the general character of the air flow remains substantially the same.

The relation of the axial speed of the drum to its speed of rotation, and also the angle of obliquity of the ribs, may therefore be varied between wide limits without departing from the scope of the invention.

If desired, an additional stationary member may be employed, such member being arranged so that it serves to deflect air into the channels which would otherwise pass the drum without contact. The member used for the purpose of directing air into the drum channels also may be advantageously provided with suitable stationary vanes for directing the air streams, such vanes bearing much the same relation to the ribs 19 as do the stationary vanes to the rotor vanes in a turbine.

The specific manner of mounting the brake drum herein disclosed is illustrative only, since the invention is capable of being applied to many different arrangements of brake mechanism, and it is therefore to be understood that the invention is not limited to the specific embodiment shown, but is to be considered as embracing all devices falling within the scope of the appended claims.

What I claim is:

1. In a self-propelled vehicle, a power transmitting shaft disposed generally longitudinally of the vehicle, brake mechanism comprising a drum secured to said shaft, brake elements arranged to contact the inside surface of the drum, and oblique ribs on the outside surface of the drum forming passages between them for flow of air, said ribs being arranged so that the ends thereof which are in advance with respect to the direction of rotation of the drum are also in advance with respect to the direction of movement of the vehicle.

2. In a self-propelled vehicle having driving wheels, a power transmitting shaft disposed generally longitudinally of the vehicle, said shaft being so geared to the driving wheels that its speed of rotation is materially greater than the speed of rotation of the wheels, brake mechanism comprising a drum secured to said shaft, brake elements arranged to contact the inside cylindrical surface of the drum, and oblique ribs on the outside cylindrical surface of the drum forming passages between them for flow of air, said ribs being arranged so that the ends thereof which are in advance with respect to the direction of rotation of the drum are also in advance with respect to the direction of movement of the vehicle.

3. In a self-propelled vehicle, brake mechanism comprising a drum mounted to rotate in a plane generally transverse to the length of the vehicle and at a speed proportional to the speed of the vehicle, brake elements arranged to contact the inside surface of said drum, and ribs on the outside surface of the drum forming passages for flow of air, said ribs being disposed at an angle with respect to the axis of rotation of the drum and said angle being such as to permit axial movement of the drum through a body of still air without causing material lateral deflection of the air flowing axially of the drum between said ribs.

FREDRIK LJUNGSTRÖM.